March 10, 1959 L. SCHMIDT 2,876,582
FISHING FLOAT
Filed Aug. 5, 1954 2 Sheets-Sheet 1
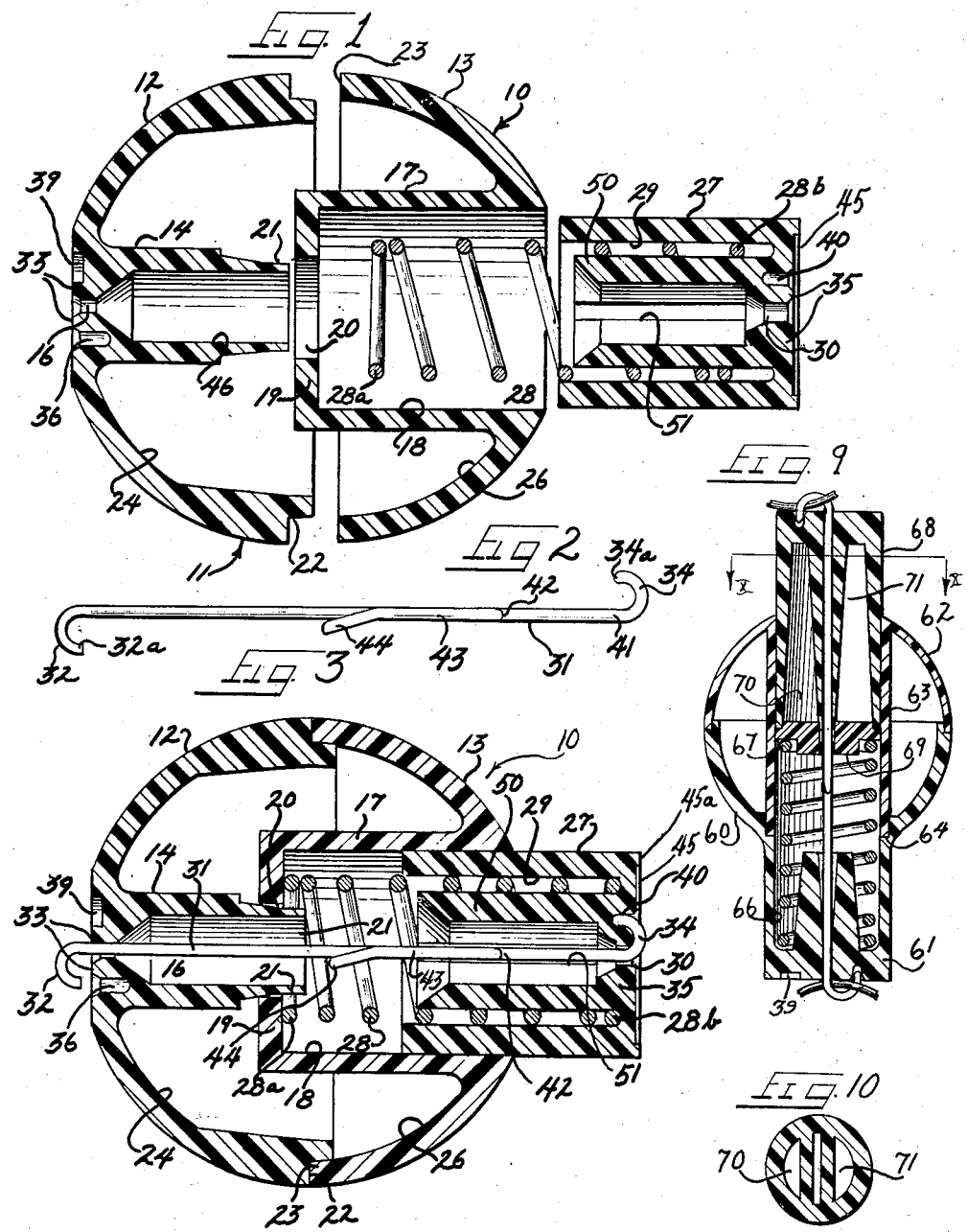
Inventor
LUDWIG SCHMIDT

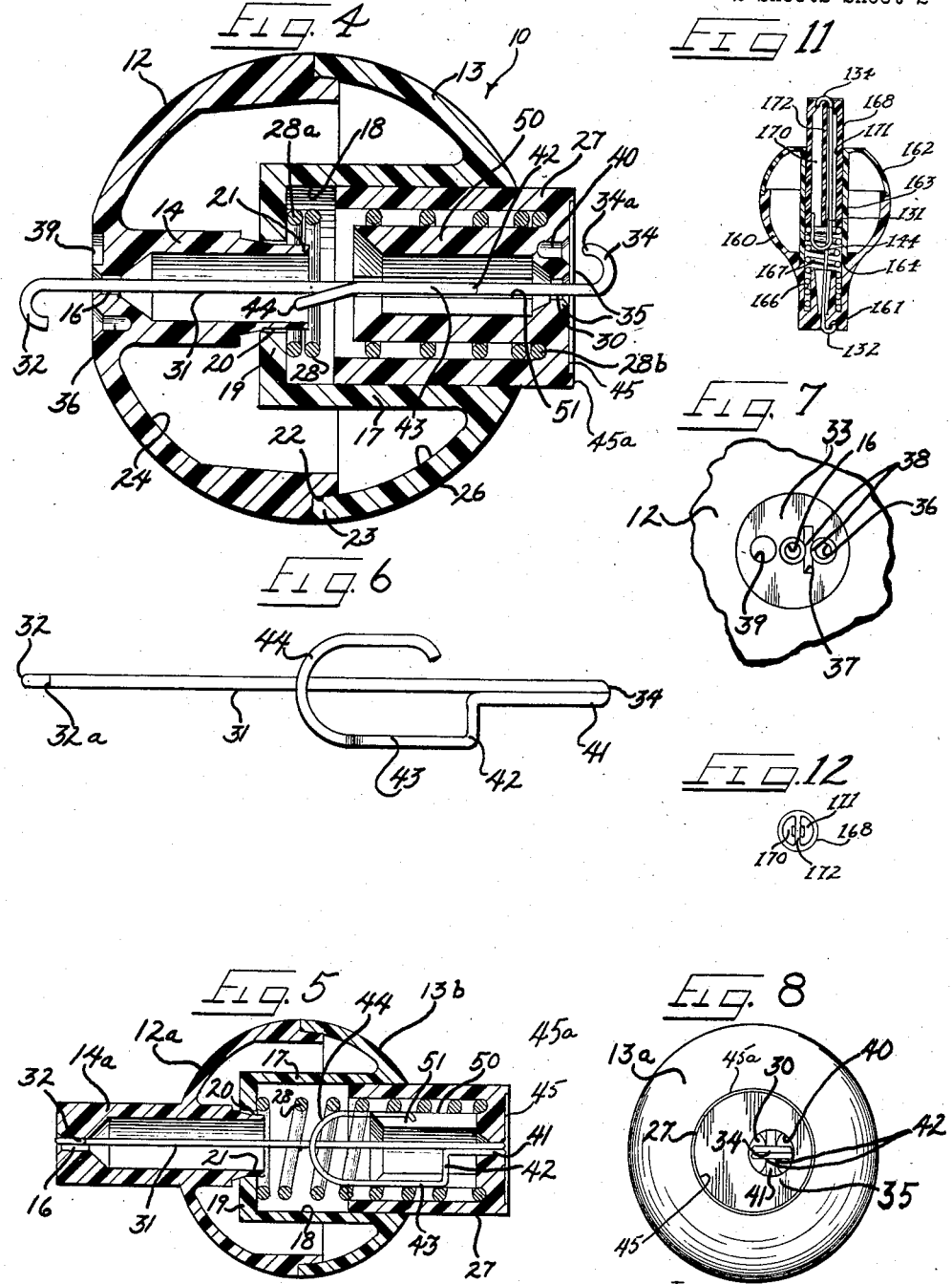

United States Patent Office 2,876,582
Patented Mar. 10, 1959

2,876,582

FISHING FLOAT

Ludwig Schmidt, Montague, Mich.

Application August 5, 1954, Serial No. 447,985

4 Claims. (Cl. 43—44.95)

This invention relates generally to fishing equipment and more particularly to a float which is adapted to be attached to a fishing line.

According to the principles of the present invention, a fishing float is provided which constitutes buoyant means providing first and second parts taking the form of generally hemi-spherical hollow part members. The first hemi-spherical part member has a radially extending boss formed with a passage extending therethrough. The second hemi-spherical part member has a boss of larger size providing cylindrical walls surrounding a recess and providing a radial wall forming the bottom of the recess. An opening is formed in the radial wall through which the boss on the first part projects. The first and second hemi-spherical parts are bonded into sealed firm assembly with one another at adjoining abutment surfaces provided by the peripheral edges thereof and also at the point of juncture between the radial wall and the boss on the first part.

The float construction further includes a third part which constitutes a generally cylindrical plunger reciprocably supported by the cylindrical walls of the boss in the second part so that the plunger will be movable inwardly and outwardly with respect to the recess.

A coil spring having one end surrounding the projecting end of the boss of the first part is bottomed against the radial wall and has the other end thereof engaging the third part so as to bias the third part outwardly. The plunger also has a passage formed therein which constitutes a selectively adjustable continuation of the passage in the first boss. A wire form member of longer length than the diameter of the assembled hemi-spherical parts extends through the passage and has first and second hooks formed on the opposite ends thereof engaging the first part and the plunger, respectively, to clamp a fishing line inserted under the hooks.

The plunger is selectively moved inwardly so as to unseat the first hook whereupon a fishing line may be inserted under the hook. Medial abutment means are provided on the wire form member and will engage the boss portion of one of the hemi-spherical members so that further inward movement of the plunger will uncover the second hook, thereby effecting a double line lock attachment of the fishing float to the fishing line.

The abutment means on the wire form member preferably constitutes a bent portion of wire integral with the wire form member, which abutment means may cooperate with a slotted recess formed in the plunger to facilitate co-rotation of the wire form member with the plunger. By virtue of such provision, the wire form member may be selectively rotated to angularly position the hook on the end of the wire form member. The hook is thus moved into selective register with circumferentially spaced recesses formed in the edges of one of the hemi-spherical parts at one end of the passage and adjacent the passage. The circumferentially spaced recesses are of different axial depth so that the hook will be received and seated in a corresponding recess in either a casting loop forming position or a fishing line clamping position.

It is an object of the present invention, therefore, to provide an improved fishing float embodying a minimum number of simplified parts which are endurable in service and which will operate efficiently for the purpose intended.

Another object of the present invention is to provide a fishing float which will incorporate an improved double line lock construction.

Yet another object of the present invention is to provide an improved fishing float which will provide a float axis coincident with the axis of the fishing line to which the float is attached.

A still further object of the present invention is to provide a fishing float having wire form line attaching means which may be positively rotated to selected circumferentially spaced positions.

A still further object of the present invention is to provide a fishing float having a wire form line attaching means and a depressible plunger which may be operated to selectively uncover line engaging hooks formed on opposite ends of the wire form member.

Many other features, advantages and additional objects of the present invention will become manifest to those versed in the art upon making reference to the detailed description which follows in which a preferred structural embodiment incorporating the principles of the present invention is described.

On the drawings:

Figure 1 is an exploded view showing the disassembled components of a fishing float and with parts omitted for the sake of clarity;

Figure 2 is an elevational view of a wire form member provided for the fishing float of the present invention;

Figure 3 is a cross-sectional view of an assembled fishing float provided in accordance with the principles of the present invention and with the movable plunger partially depressed so as to uncover one of the hooks provided on the end of the wire form member;

Figure 4 is across-sectional view similar to Figure 3 but showing the movable plunger depressed to a position wherein both of the line engaging hooks are uncovered;

Figure 5 is a cross-sectional view similar to the cross-sectional views of Figures 3 and 4 but illustrating a smaller size embodiment of a fishing float according to the present invention;

Figure 6 is a side elevational view of the wire form members shown in Figure 2;

Figure 7 is an end elevational view of the device shown in Figures 3 and 4;

Figure 8 is an end elevational view showing additional details of construction of the plunger as utilized in Figures 3, 4 and 5;

Figure 9 is an alternative embodiment of small sized floats;

Figure 10 is a cross-section taken on line X—X of Figure 9;

Figure 11 is an alternative embodiment of small sized floats; and

Figure 12 is a transverse view of the plunger of Figure 11.

The fishing float of the present invention is indicated generally at 10 and comprises buoyant means 11 providing first and second parts indicated by the reference numeral 12 and 13, respectively.

The first part 12 comprises a generally hemispherical hollow member having a boss 14 extending generally radially and providing a bore 16 which extends therethrough on a diametral axis.

The second part 13 constitutes a generally hemispherical hollow member having cylindrical walls 17 surrounding a recess 18, the end wall of the recess 18 being provided by a radial wall 19. An opening 20 is formed in the radial wall 19 through which a projecting pilot portion 21 of the boss 14 is extended.

The first part 12 is provided with an annular peripheral recess 22 seating a peripheral edge 23 formed on the second part 13 so that the assembled-together first and second parts will provide a generally spherical shaped object. Before assembling the first and second parts 12 and 13, which may conveniently comprise members made of a suitable plastic material, a small quantity of liquid solvent may be introduced into the hollow interior recess 24 of the first part 12 or the hollow interior recess 26 of the second part 13. Upon placing the first and second parts 12 and 13 in mechanical assembly, therefore, the solvent is distributed throughout the interior of the recesses 24 and 26 and particularly over the points of juncture forming the joint between the annular recess 22 and the peripheral edge 23 and the edges of the opening 20 in the radial wall 19 and the wall portions of the projecting pilot portion 21 on the boss 14 so as to firmly bond the parts 12 and 13 into sealed together firm assembly with one another. It will be understood that the sealing action effectively isolates the recesses 24 and 26 making the spherical object water tight and preserving the buoyancy of the float 10.

In this regard, it should be particularly noted that the construction whereby the radial wall 19 is provided with an opening 20 to receive the projecting pilot portion 21 greatly enhances the sealing characteristics of the float 10 since a particularly small sealing area may be closed off. Furthermore, greater manufacturing tolerances are permitted with this design since this portion of the device could also be readily sealed through the recess 18 by virtue of the projecting relationship of the pilot portion 21 through the opening 20 and up into the recess 18 beyond the limits of the radial wall 19. The relative amount of projection is clearly indicated in Figures 3, 4, and 5 where the parts are assembled together.

A third part of the assemblage is indicated at 27 and constitutes a generally cylindrical plunger which is reciprocably supported by the cylindrical walls 17 and which is movable in the recess 18 inwardly and outwardly relative to the spherical object 12, 13.

A coil spring 28 has one end 28a which surrounds the projecting pilot portion 21 of the boss 14. The end 28a also bottoms against the radial wall 19.

The other end of the coil spring 28 indicated at 28b is received within an annular recess 29 formed within the plunger 27 so that the plunger 27 will be biased in an outward direction.

The third part or plunger 27 has a passage 30 formed therein which forms virtually a selectively adjustable continuation of the passage 16 provided by the boss 14 since the plunger 27 is telescopically movable in the recess 18. In other words, it will be understood that although various sized counter bores and other reliefs are formed along the length of the passage, the passage 16, 30 extends in a diametral axis completely through the spherical object formed by the first and second parts 12 and 13 and by the third part 27.

The end of the plunger 27 is recessed as at 45 so that a peripheral lip 45a is provided which functions as a finger grip in manipulating the plunger.

In accordance with the principles of the present invention, a wire form member 31 is located in the passage 16, 30 and is of a longer length than the diameter of the assembled hemi-spherical parts 12 and 13.

A first hook 32 is formed on one end of the wire form member 31 and constitutes a laterally off-set reversely turned end portion which overlies the edges 33 of the first part 12 adjacent the passage 16.

A second hook 34 is formed on the other end of the wire form member 31 and constitutes a laterally off-set reversely turned end portion which overlies the edges 35 of the third part 27 adjacent the passage 30.

It may be noted that the first and second hooks 32 and 34 are spaced apart longitudinally a sufficient distance to prevent separation of the plunger 27 and the spherical object provided by the first and second parts 12 and 13. In other words, if the spherical object provided by the parts 12 and 13 is considered as one part and the plunger 27 is considered as a second part, it will be appreciated that the separation of the first and second parts is precluded by the hooks 32 and 34 because the hooks operate to prescribe limits of relative axial movement between the parts.

Referring particularly to Figure 7 in connection with the other figures of the drawings, it will be noted that the edges 33 are particularly characterized by the formation therein of a first axially extending recess 36. The axial extent of the recess 36 is preferably greater than the corresponding axial extent of the reversely turned portion of the first hook 32, which reversely turned portion is indicated on Figure 2 at 32a. Moreover, the recess 36 is spaced radially outwardly of the axis established by the passage 16 so as to come in register with the reversely turned portion 32a thereby to receive and seat the hook 32 in a fishing line clamping position.

A shallow rectangular recess 37 is advantageously provided between the passage 16 and the recess 36 so as to provide opposed edges 38 which have the effect of providing a V-block clamp for the fishing line inserted under the hook 32. Thus, when the hook 32 is seated in the recess 36 a fishing line is inserted under the hook 32 will be firmly clamped against relative displacement with respect to the float 10.

On the opposite side of the passage 16 there is provided a second recess 39. The axial extent of the recess 39 is preferably less than the corresponding axial extent of the reversely turned portion 32a on the hook 32 so that the curved portion of the hook 32 will stand away from the edges 33 thereby to form a continuous closed loop relative to the end surface of the first part 12. In other words, if the hook 32 is turned through 180° so that the reversely turned portion 32 is placed in register with the shallow recess 39, the hook 32 will be received and seated in the recess 39 and will form a loop through which a fishing line may freely pass. In this manner, the float 10 may be movably related to a fishing line threaded through the loop for a selective sliding action.

On the plunger 27, a recess 40 is spaced radially outwardly of the passage 30 and has an axial extent greater than the reversely turned portion 34a of the second hook 34 thereby to receive and seat the hook 34. As shown in Figure 8, a shallow rectangular recess 41 may be conveniently located between the passage 30 and the recess 40, thereby to provide edge portions indicated at 42 which will have a V-block vise gripping effect on any fishing line inserted under the hook 34 so as to clamp the float to the line in firm attachment therewith.

As will be noted upon inspecting Figures 2 and 6, the reversely turned portion 34a of the hook 34 is again bent back upon itself so as to provide a second leg 41 which lies immediately adjacent and parallel to the main leg of the wire form member 31. The second leg 41 has a transverse abutment 42 which is provided by bending the second leg 41 at a right angle. The abutment leg 42 terminates in another acutely off-set leg indicated at 43 on Figure 6 which, in turn, terminates in a curved portion 44 having a radius of curvature of sufficiently large extent that the curved portion 44 has a diameter greater than a counter bore 46 provided in the boss 14.

It will be noted that the curved portion 44 is angularly off-set (see Figure 2) so that the curved portion crosses over the main longitudinal axis of the wire form member 31. By virtue of this arrangement, the curved portion 44 is positioned in registry with the boss 14, whereupon movement of the wire form member 31 along the longitudinal axis thereof will engage the curved portion 44 in a seating relationship on the edges of the projecting pilot portion 21 of the boss 14.

With these features of construction in mind, advantageous reference may be made to Figure 3 which illustrates how the hook 32 may be uncovered or moved away from the edges 33 and out of the recess 36 so that a fishing line may be inserted under the hook 32. As shown in Figure 3 the components of the float are fully assembled and the plunger 27 is partially depressed against the bias of the coil spring 28 so that the plunger 27 is moved inwardly into the recess 18. The wire form member 31 is carried along with the plunger 27 so that it moves longitudinally and the hook 32 is moved out of the recess 36 into the position shown in Figure 3. Having threaded a fishing line under the hook 32, the plunger 27 may be released whereupon the spring 28 will bias the plunger 27 outwardly and the hook 32 will again seat in the recess 36 thereby firmly clamping and locking the fishing line against the edges 38 provided by the shallow recess 37. During this part of the operation, it will be noted that the curved portion 44 of the wire form member 31 moves through the recess 18 towards the boss 14 and particularly towards the projecting pilot portion 21.

Referring now to Figure 4, it will be noted that continued inward movement of the plunger 27 as prescribed by the walls 17 surrounding the recess 18 moves the wire form member 31 so that the curved portion 44 engages and seats against the edges of the projecting pilot portion 21 on the boss 14. Thus, there is no further movement of the wire form member 31 to the left, using the orientation of Figure 4, and the plunger 27 may be moved further inwardly against the bias of the coil spring 28 and the hook 34 will be uncovered since the reversely turned portion 34a will be unseated from the recess 40. The fishing line may then be inserted under the hook 34 and the plunger 27 may be released. The coil spring 28 will bias the plunger 27 outwardly to reseat the reversely turned portion 34a of the hook 34 in the recess 40 thereby clamping and locking the fishing line against the edges 42 of the shallow recess 41 formed in the edges 36.

It is highly desirable that the angular position of the wire form member 31 be controlled to keep the hooks 32 and 34 in proper register with the recesses.

In accordance with the principles of the present invention, the plunger 27 has an upstanding cylindrical wall indicated at 50 located concentrically radially inwardly of the annular recess 29 and concentrically radially outwardly of the passage 30.

The wall 50 is slotted as at 51 and it will be noted upon making reference to Figure 5 that the slot 51 receives the second leg 43 and the abutment 42 thereby to provide an abutment means or a tongue and groove detent means between the wire form member 31 and the plunger 27. In other words, the wire form member 31 is securely locked for co-rotation with the plunger 27 and is effectively "polarized" so that the hooks 32 and 34 will normally be in register with the corresponding recesses 36 and 40.

Moreover, the positive rotation feature between the wire form member 31 and the plunger 27 insures positive actuation of the wire form member 31 to a different adjusted angular position if so desired. In this regard, if it is desired to form a casting loop with the hook 32, the wire for mmember 31 may be rotated through 180° of angular adjustment merely by partially depressing the plunger 27 to clear the hook 32 from the edges 33 whereupon the plunger together with the wire form member 31 is rotated until the hook 32 comes in register with the shallow recess 39. Release of the plunger will permit the coil spring 28 to bias the plunger 27 outwardly and the hook 32 will be seated in the recess 39 to form a loop through which the fishing line may be threaded.

The physical principles of the embodiment illustrated in Figure 5 are the same as those incorporated in the embodiments previously described, however, the shape of the first and second parts, indicated in Figure 5 at 12a and 13b, is slightly different because this embodiment is intended for use in small size floats where it is desirable that the float be coincident with the axis of the fishing line and where it is desirable that the float ride as high in the water as possible. Thus, the part 12a is similar in all respects to the part 12 with the exception that the outer wall, instead of being flush with the end of the boss portion here indicated at 14a, intersects a medial portion thereof so that the boss 14a projects not only inwardly of the part 12a but also outwardly thereof. The part 13b is similar to the part 13 with the exception that the outer wall is made smaller in order to complement the change in configuration of the part 12a. In all other respects, the embodiment of Figure 5 is similar to the embodiments already described and in operation it will be noted that the float of Figure 5, like the float 10, may be attached to a fishing line with the axis thereof coincident with the axis of the fishing line by effecting a double line lock under the hooks 32 and 34. If a casting loop attachment is desired, the wire form member 31 may be adjusted so as to provide such a loop with the hook 32.

In Figure 9, a first part 60 has an outer extension 61 positioned below the water line. A second part 62 has either an integral inner extension or a separate sleeve 63 which is seated and sealed on a shoulder 64. A common bore 66 formed by the sleeve 63 and the outer extension 61 receives and bottoms a spring 67 which biases a plunger 68 upwardly.

The plunger 68 is itself buoyant because a plug 69 seals closed air pockets 70 and 71 while passing a wire form member similar to member 31 already described.

The increased buoyancy in a small float insures upright positioning of the float in the water.

In Figure 11, a first part 160 has an outer extension 161 positioned below the water line. A second part 162 has either an integral inner extension or a separate sleeve 163 which is seated and sealed on a shoulder 164. A common bore 166 formed by the sleeve 163 and the outer extension 161 receives and bottoms a spring 167 which biases a plunger 168 of minimized size upwardly.

The plunger 168 has recesses 170 and 171 formed therein on opposite sides of a center rib 172. A simplified wire form member 131 has a medial loop 144 forming a stop and has hooks 132 and 134 at opposite ends. The wire form member is offset sufficiently to pass through the recess 171 while the loop 144 is received in the recess 170. The hooks 132 and 134 are formed after assembly and are similar in position and structure to the hooks 32 and 34.

Although I have resorted to detail in the description of my invention for the sake of clarity, it should be understood that minor modifications might be effected by those versed in the art without departing from the essential principles of the invention and, accordingly I wish to embody within the scope of the patent warranted hereon all such modifications as reasonably and properly come within the scope of my contribution to the art.

I claim as my invention:

1. A fishing float comprising buoyant means providing first and second parts, said first part comprising a generally spherical hollow member having a first means provided with a bore extending therethrough on a diametral axis, said hollow member having a second means forming a wall concentric with said diametral axis and providing a counter bore terminating in a radial wall at the bottom of said counter bore, said second part comprising a generally cylindrical plunger complementary in configuration to said counter bore and telescopically received and supported for reciprocation therein, said second part having means provided with a bore therethrough in register with said bores in said first part and being further provided with an annular recess concentric with the means providing said bore in said second part; a coil spring bottomed at one end in said annular recess and bottomed at the other end against said radial wall, thereby to load said first and second parts in opposite axial directions, a wire form member extending through said bores in said first and second parts, a first hook formed on one end of said wire form member and constituting a laterally off-set reversely turned end portion to overlie the external surface portion of said first part adjacent said bore therein, a second hook formed on the other end of said wire form member and constituting a laterally off-set reversely turned end portion to overlie the edges of said second part adjacent said bore therein, said first and second hooks being spaced apart longitudinally a sufficient distance to prevent separation of said first and second parts while prescribing limits of relative axial movement between the parts, a first axially extending recess formed in said external surface portion of said first part in register with said first hook to receive and seat said first hook, thereby to provide one line lock when a fishing line is inserted under said first hook, and a second axially extending recess formed in said external surface portion of said second part in register with said second hook to receive and seat said second hook, thereby to provide a second line lock when a fishing line is inserted under said second hook, whereby the axis of said float will be coincident with the axis of the fishing line to which it is attached, said wire form member having the reversely turned portion forming said second hook extended and shaped to form a transverse abutment, and said second part having a slot formed therein receiving said abutment to connect said wire form member for co-rotation with respect to said second part, whereby said first hook may be angularly displaced out of register with its corresponding recess to engage an adjoining external surface portion of said first part and to form together therewith a loop through which a fishing line may be threaded.

2. A fishing float comprising a hollow float body having a centrally disposed integral sleeve-like post, said post having an enlarged portion at one end thereof to provide a recess forming a socket for receiving a coil spring, a cap member extending substantially over said spring slidably mounted in said enlarged portion of said post, a wire form shaft extending through said cap member and said post, a reversely turned hook formed integrally with each end of said shaft, the other end of said post having an end wall, said end wall having a first opening therethrough for the slidable reception of said shaft, said end wall having a second opening eccentrically positioned with respect to said first opening, said cap member having a first opening therethrough for the slidable reception of said shaft, said cap member having a second opening eccentrically positioned with respect to said first opening, said hooks having their free ends receivable in said eccentric openings, the outer side of said end wall and said cap member being urged towards the bight portion of the respective hooks, said bight portions being adapted to receive a fishing line for interchangeably clamping and slidably mounting the float body on the fishing line, said reversely turned hook on one end of said wire form shaft being again bent back upon itself to provide a second leg immediately adjacent and parallel to the main leg of the wire form shaft, said second leg being offset transversely to form an abutment, and said abutment terminating in an axially extending curved portion of sufficiently large size to be engageable with said other portion of said post, said cap member having a slot receiving said abutment and said axially extending curved portion to connect said wire form shaft for corotation with said cap member.

3. A fishing float as defined in claim 2, said cap member having an abutment spaced from but confronting said abutment on said wire form shaft and engageable therewith upon depression of said cap member to first expose one of said hooks and then engage said curved portion of said wire form shaft against said other end portion of said post whereupon continued depression of said cap member will expose the other of said hooks.

4. A fishing float as defined in claim 2, at least one of said outer sides of said end wall and said cap member having a shallow rectangular recess formed therein between the corresponding first and second openings and providing opposed edges having a block vise gripping effect on the fishing line inserted under the corresponding hook.

References Cited in the file of this patent
UNITED STATES PATENTS

| | | |
|---|---|---|
| 575,674 | Woodward | Jan. 19, 1897 |
| 2,065,854 | Edel et al. | Dec. 29, 1936 |
| 2,255,853 | Makus et al. | Sept. 16, 1941 |
| 2,670,560 | Matras | Mar. 2, 1954 |
| 2,706,869 | Shoenfelt | Apr. 26, 1955 |
| 2,758,410 | Cowsert | Aug. 14, 1956 |
| 2,767,506 | Robinson | Oct. 23, 1956 |